United States Patent Office 3,241,330
Patented Mar. 22, 1966

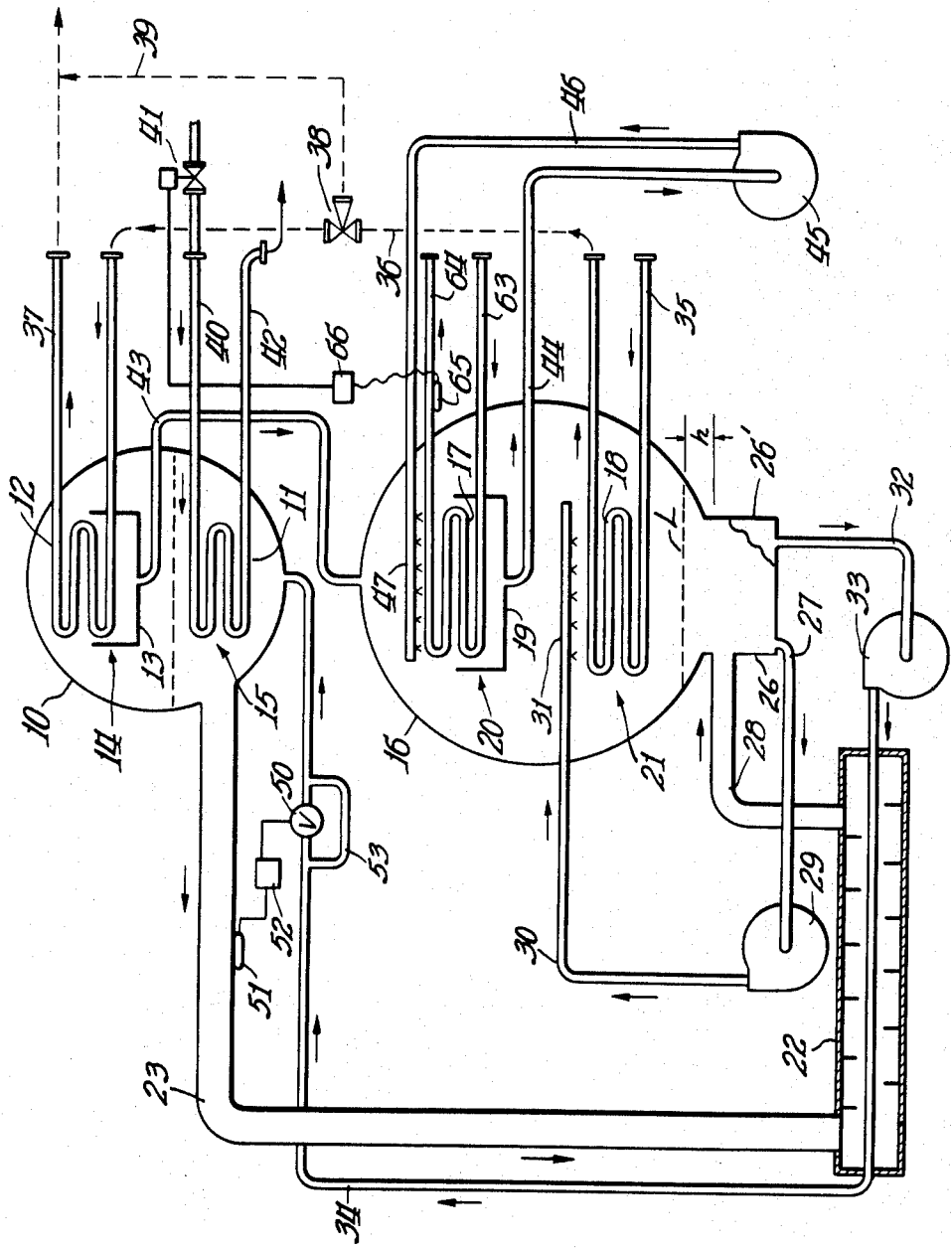
INVENTOR.
JOSEPH G. MURRAY
ATTORNEY

3,241,330
PREVENTION OF CONCENTRATED SOLUTION FLASHING IN AN ABSORPTION REFRIGERATION SYSTEM
Joseph G. Murray, North Olmsted, Ohio, assignor to Borg-Warner Corporation, Chicago, Ill., a corporation of Illinois
Filed Aug. 8, 1963, Ser. No. 300,797
5 Claims. (Cl. 62—101)

This invention relates to absorption refrigeration systems and more particularly to a method for preventing concentrated solution from flashing in the absorber unit.

For the purpose of this specification, it will be assumed that the absorption refrigeration system under consideration is of the type which employs a saline solution as the absorbent and water as the refrigerant. Inasmuch as lithium bromide has been found to be a suitable absorbing medium, reference will be made herein to a system utilizing this salt as the absorbent; but it should be understood that the invention has general application to any of several other known absorbent refrigerant systems. Also for purposes of illustration, the "concentrated" solution means a solution of relatively higher concentration in lithium bromide (approximately 64.5 percent), while the "dilute" solution may be defined as a solution relatively lower in concentration of lithium bromide (approximately 59.5 percent).

Conventional absorption refrigeration systems often employ means for flash cooling of the concentrated absorber solution either prior to its introduction into the absorber unit or directly within the absorber shell. Heretofore, it has been thought to be desirable to obtain the benefit of some additional cooling of the concentrated solution. However, as the efficiency of heat exchangers has been increased by more advanced technology, the improved heat exchangers now used to transfer heat from the hot, concentrated solution leaving the generator to the cold, dilute solution from the absorber, have been found to be adequate, without flash cooling, to reduce the temperature of the regenerated absorber solution to its desired value. Consequently, the disadvantages of flash cooling have outweighed their usefulness.

In a typical absorption refrigeration system of the type employing water as the refrigerant and a solution of lithium bromide as the absorbent (hereinafter referred to as the absorber solution), the absorber solution leaving the absorber is at a temperature of approximately 100° F. and has a concentration of 59.5 percent lithium bromide. In its pass through the heat exchanger, the temperature is raised from 100° F. to 168° F. and the resulting dilute solution is supplied to the generator. Inside the generator, the refrigerant is boiled off, resulting in a hot, concentrated solution of about 64.5 percent lithium bromide which leaves the generator at a temperature of about 212° F. Before the concentrated solution is introduced into the absorber, the temperature must be lowered in the heat exchanger to increase its effectiveness as an absorbent and prevent undesirable flashing in the lower pressure (about 5 to 6 mm. of mercury) exiting in the absorber-evaporator shell. Accordingly, in its pass through the heat exchanger, the temperature of the hot, concentrated solution is lowered from approximately 212° F. to about 130° F. While flash cooling was effective in lowering the temperature still further to within a range of about 127° F. to 128° F., increased heat exchanger efficiency has been effective to bring down the temperature to within this range without flash cooling.

Since flashing within the absorber often causes an explosive evaporation of the relatively warm absorber solution inside the shell, this may result in the contamination of the refrigerant solution circulating in the upper portion of the absorber-evaporator shell. One known absorption system which is adapted to avoid flashing directly within the absorber-evaporator shell uses what is known as a flash chamber. This flash chamber comprises a separate tank mounted on the shell, the interior of which communicates with the shell through a narrow throat. This arrangement is effective in isolating the flashing and tends to retard the splashing of absorber solution into the evaporator setcion. The flash chamber, however, constitutes an expensive modification of the shell, and has the further disadvantage of increased weight and size.

The present invention is directed to a method for mixing the concentrated solution with dilute solution from the absorber in a manner so as to prevent flashing of the warm, concentrated solution. In a preferred embodiment, a mixing zone for the concentrated and dilute solution is provided, said mixing zone being arranged so that the static pressure of dilute solution sufficient to compensate for the difference between the vapor pressure of the concentrated solution and the absolute pressure in the absorber, eliminates flashing of the warm, concentrated solution during the introduction thereof into said mixing zone.

It is a principal object of the present invention to provide an improved absorption refrigeration system wherein concentrated absorption solution from the generator and heat exchanger is mixed with dilute solution from the absorber in such a manner that flashing is prevented.

It is another object of the present invention to provide a method of operating an absorption refrigeration system to prevent flashing of the warm, concentrated solution flowing from the generator.

Other and more particular objects and advantages will be apparent from the reading of the specification together with the appended drawing in which the figure is a schematic representation of an absorption refrigeration system embodying the present invention.

Turning now to the figure, a shell 10 is provided having a heat exchanger 11 and a heat exchanger 12 disposed therein. A pan or receptacle 13 positioned below heat exchanger 12 combines therewith to form a condenser 14. Heat exchanger 11, disposed underneath the heat exchanger 12, cooperates with the shell 10 to form a generator 15. A second shell 16, ordinarily positioned below shell 10, includes a heat exchanger 17 and a heat exchanger 18. Heat exchanger 17 is provided with a pan 19 which combines therewith to form an evaporator 20. Heat exchanger 18 cooperates with shell 16 to form an absorber 21. A pressure differential exists between shells 10 and 16 corresponding to the condenser pressure and evaporator pressure of the refrigerant. Suitable means (not shown) are provided to maintain the pressure differential between the two shells. The generator 15 heats the dilute solution circulated from the absorber to drive off the refrigerant (water) and the resulting concentrated solution is flowed to the absorber to absorb the refrigerant (in the form of vapor) evaporated in the evaporator section. After the refrigerant is absorbed, the absorber solution being diluted thereby, the dilute solution is pumped to the generator to complete the cycle.

In order to increase the efficiency of the system, it has been found to be desirable to provide heat exchange means to transfer heat from the hot solution leaving the generator to the relatively cool, dilute solution drained from the absorber. Accordingly, a hot, concentrated solution line 23 leads from the lower portion of shell 10 to the heat exchanger 22.

A concentrated solution line 28 leads from the heat exchanger 22 to a dilute solution sump 26 (partially broken away in the drawing to illustrate a separate sump 26') provided in the lower portion of shell 16, said sump 26 providing a mixing zone for the concentrated and dilute solutions. Alternatively, line 28 may be interconnected with dilute solution line 27 to provide a mixing zone in line 27. In either case, the absorber pump 29 has a pumping capacity greatly in excess of the concentrated solution flow quantity received from line 28, with the result that all of the concentrated solution from line 28 plus a considerable quantity of dilute solution from the absorber are mixed together to form an intermediate strength solution which is supplied through line 30 to a spray header above heat exchanger 18.

A dilute solution line 32 connects a second sump 26', which is spaced longitudinally of the shell 16 from sump 26 and entirely separate therefrom, to the generator pump 33. The cool, dilute solution from the absorber is then passed through heat exchanger 22, in heat exchange relation with the hot, concentrated solution, and supplied to the generator through line 34.

A line 35 supplies cooling water from any suitable source to the heat exchanger 18 of absorber 21 for the purpose of removing the heat generated by the dilution of the concentrated solution of absorbent. Crossover line 36 is provided which delivers the cooling water after passing through the absorber to the condenser heat exchanger 12 where it functions to draw heat from the refrigerant condensing thereon. The cooling water leaves heat exchanger 12 by means of a line 37. A manual valve 38 is connected into crossover line 36 to bypass cooling water through line 39 around the condenser to adjust the condenser coil temperature.

A heat exchange medium, commonly water, is supplied to the evaporator heat exchanger 17 through line 63 and the chilled water is discharged through line 64 to be delivered ultimately to the unit or units utilizing said chilled water. In a preferred embodiment of the invention, the heating medium (preferably steam) supplied to the generator 15 is controlled in accordance with the refrigeration load on the system as indicated by the temperature of the chilled water passing through line 64. For this purpose, the steam supply line 40 is provided with automatic control means in the form of a valve 41 which is actuated by proportional controller 66 having a temperature sensing element 65 responsive to the temperature of chilled water flowing from the evaporator through line 64. Condensate outlet line 42 carries condensate from heat exchanger 11.

Solution control means may also be provided for varying the flow of absorber solution in response to the refrigeration load. Such means comprise a valve 50 in the dilute solution line 34, a bypass line 53 around said valve and valve actuating means 51, 52 responsive to the temperature of the hot, concentrated solution leaving the generator through line 23. The solution control means per se forms no part of the present invention and is merely referred to so that the operation of the system may be more clearly understood.

A liquid refrigerant line 43 leads from the lower portion of pan 13 to heat exchanger 17 of evaporator 20. A refrigerant line 44 leads from the base of pan 19 of evaporator 20 to a refrigerant pump 45 from which it is pumped through line 46 through a spray header 47 to the heat exchanger 17 of the evaporator.

*Operation*

In the upper shell 10, sometimes referred to as the generator-condenser shell, the dilute solution supplied to the generator 15 is heated to drive off the refrigerant, namely water, in an environment maintained at condenser pressure, about 70 mm. of mercury. The refrigerant is condensed on heat exchanger tubes 12 which are supplied with condensing water through line 36. The condensed refrigerant, collected in pan 13, is then passed through line 43 to the lower shell 16 which is maintained at an absolute pressure on the order of 5 to 6 mm. of mercury. When the refrigerant flows into the evaporator section of shell 16, it evaporates and absorbs the heat from the heat exchange medium being circulated through heat exchanger 17 of which is disposed above the evaporator pan 19. Any refrigerant not evaporated during its pass over the evaporator tubes 17 is recirculated through refrigerant pump 45 to the spray header 47. The pressure is maintained within the evaporator absorber shell 16 by the hydroscopic action of the concentrated or strong solution supplied to the absorber section of the shell, so that the system requires only occasional purging of non-condensibles during operation.

As the absorber solution is diluted by the water vapor absorbed therein, it is collected in sump 26' and drawn off through line 32 to the generator pump 33. It is then circulated to the generator through heat exchanger 22 where it comes into heat exchange relation with the hot, concentrated solution flowing from the generator through line 23. The concentrated solution is supplied to the lower portion of absorber through line 28 where it mixes with the dilute solution collected in sump 26; and the resulting intermediate solution is withdrawn through line 27 and continuously recirculated by the absorber pump 29 to spray header 31 above the absorber coils 18.

In accordance with the principles of the present invention, the mixing zone for the concentrated and dilute solutions is maintained under a static pressure greater than the pressure differential between the vapor pressure of the warm, concentrated solution and the absolute pressure inside the absorber (vapor pressure of cool, dilute solution). In a preferred embodiment, this is accomplished by introducing the warm, concentrated solution into sump 26 below the normal operating level, designated at L on the figure, of the solution in the absorber. The static pressure available to suppress flashing is represented by the distance $h$ multiplied by the specific gravity of the dilute solution. During normal operations, the level L may vary up and down depending on the refrigeration load imposed on the system. Accordingly, some safety margin should be allowed so that even when the level L is below its normal operating level, there is sufficient static pressure above the inlet line 28 to prevent flash evaporation of the concentrated solution.

While the invention has been described in connection with certain specific embodiments thereof, it should be understood that various modifications will occur to those skilled in the art. Therefore, the invention is defined solely by the appended claims which should be given a scope as broad as the prior art will permit.

What is claimed is:

1. A method of operating an absorption refrigeration system of the type including an absorber, an evaporator, a generator, and a condenser connected to provide a refrigeration circuit comprising the steps of:
   passing concentrated solution from said generator to said absorber;
   introducing said concentrated solution into means defining a mixing zone secured to said absorber below the normal operating level of dilute solution collected in said absorber; and
   withdrawing the intermediate strength solution mixture of concentrated and dilute solution from said mixing zone and introducing it into said absorber.

2. A method of operating an absorption refrigeration system of the type including an absorber, an evaporator, a generator, and a condenser connected to provide a refrigeration circuit comprising the steps of:
   supplying concentrated solution from said generator to means defining a mixing zone secured to said absorber;
   collecting dilute solution from said absorber in said mixing zone;
   mixing said concentrated solution with said dilute solution in said mixing zone while maintaining sufficient static pressure on said concentrated solution to prevent flashing of said concentrated solution; and supplying the resulting intermediate strength solution to said absorber.

3. A method of operating an absorption refrigeration system of the type including an absorber, an evaporator, a generator, and a condenser connected to provide a refrigeration circuit comprising the steps of:
  supplying concentrated solution from said generator to means defining a mixing zone secured to said absorber;
  collecting dilute solution in said mixing zone in said absorber to establish a normal operating level above said mixing zone;
  introducing said concentrated solution into said mixing zone sufficiently below the nomal operating level of dilute solution so that the static pressure provided thereby suppresses flashing of said concentrated solution; and
  supplying the resulting intermediate strength solution from said mixing zone to said absorber.

4. A method of operating an absorption refrigeration system of the type including an absorber, an evaporator, a generator, and a condenser connected to provide a refrigeration circuit comprising the steps of:
  passing concentrated absorber solution from said generator to said absorber;
  collecting dilute solution in a sump means secured to said absorber;
  mixing the concentrated solution with said dilute solution in said sump means while maintaining sufficient static pressure on said concentrated solution to prevent flashing of said concentrated solution; and
  supplying the resulting intermediate strength solution from said sump means to said absorber.

5. A method of operating an absorption refrigeration system of the type including an absorber, an evaporator, a generator, and a condenser connected to provide a refrigeration circuit comprising the steps of:
  passing concentrated solution from said generator to means defining a mixing zone secured to said absorber below the normal operating level of dilute solution collected in said absorber;
  passing dilute solution from said absorber in heat exchange relation with said concentrated solution and supplying said dilute solution to said generator;
  mixing said concentrated solution, after passing in heat exchange relation with dilute solution being supplied to said generator, with additional dilute solution in said mixing zone in such a manner that the pressure head provided by said dilute solution is greater than the difference between the respective vapor pressure of said concentrated solution and said dilute solution; and
  supplying the intermediate strength mixture of concentrated and dilute solution to said absorber.

References Cited by the Examiner

UNITED STATES PATENTS

| 1,982,672 | 12/1934 | Koenemann | 62—101 |
| 2,847,832 | 8/1958 | Johnson | 62—101 |
| 2,983,117 | 5/1961 | Edberg et al. | 62—476 |
| 2,154,930 | 11/1964 | Aronson | 62—148 |
| 3,154,930 | 11/1964 | Aronson | 62—148 |

ROBERT A. O'LEARY, *Primary Examiner.*